US009237458B2

(12) United States Patent
Au et al.

(10) Patent No.: US 9,237,458 B2
(45) Date of Patent: Jan. 12, 2016

(54) SYSTEMS AND METHODS FOR NETWORK MIMO

(71) Applicant: BlackBerry Limited, Waterloo (CA)

(72) Inventors: Kelvin Kar-Kin Au, Ottawa (CA); Mo-Han Fong, Carp (CA); Sophie Vrzic, Nepean (CA); Robert Novak, Ottawa (CA); Jun Yuan, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 364 days.

(21) Appl. No.: 13/932,754

(22) Filed: Jul. 1, 2013

(65) Prior Publication Data

US 2013/0294421 A1 Nov. 7, 2013

Related U.S. Application Data

(63) Continuation of application No. 13/620,680, filed on Sep. 14, 2012, now Pat. No. 8,537,773, which is a continuation of application No. 12/267,072, filed on Nov. 7, 2008, now Pat. No. 8,331,308.

(60) Provisional application No. 60/986,846, filed on Nov. 9, 2007.

(51) Int. Cl.
H04W 16/28 (2009.01)
H04B 7/02 (2006.01)
H04W 72/12 (2009.01)

(52) U.S. Cl.
CPC .............. *H04W 16/28* (2013.01); *H04B 7/024* (2013.01); *H04W 72/1278* (2013.01)

(58) Field of Classification Search
CPC ..... H04B 7/024; H04B 7/0452; H04W 16/28; H04W 72/1278; H04W 84/20
See application file for complete search history.

(56) References Cited

U.S. PATENT DOCUMENTS

| 8,331,308 | B1 | 12/2012 | Au et al. |
| 8,537,773 | B2 | 9/2013 | Au et al. |
| 2004/0131041 | A1* | 7/2004 | Tirkkonen ............. H04L 1/0625 370/349 |
| 2005/0286408 | A1 | 12/2005 | Jin et al. |
| 2006/0034217 | A1 | 2/2006 | Kwon et al. |

(Continued)

FOREIGN PATENT DOCUMENTS

WO 2007045101 A2 4/2007

OTHER PUBLICATIONS

Cudak, Mark; "IEEE 802.16m System Requirements"; IEEE 802.16m-07/002r4; Oct. 19, 2007; 26 pages.

(Continued)

*Primary Examiner* — Chirag Shah
*Assistant Examiner* — Srinivasa Reddivalam
(74) *Attorney, Agent, or Firm* — Conley Rose, P.C.; J. Robert Brown, Jr.

(57) ABSTRACT

A multiple-input, multiple-output (MIMO) communication system comprising a master base station and a slave base station. The master base station has a plurality of transmit antennas and transmits a first set of data to a mobile station in a first transmission. The slave base station has a plurality of transmit antennas and transmits a second set of data to the mobile station in the first transmission. The master base station retransmits the second set of data to the mobile station during a first retransmission and the slave base station retransmits the first set of data to the mobile station during the first retransmission.

16 Claims, 8 Drawing Sheets

(56) References Cited

U.S. PATENT DOCUMENTS

| | | |
|---|---|---|
| 2006/0120477 A1 | 6/2006 | Shen et al. |
| 2007/0010196 A1 | 1/2007 | Periyalwar et al. |
| 2007/0160162 A1 | 7/2007 | Kim et al. |
| 2010/0157901 A1* | 6/2010 | Sanderovitz ........... H04B 7/022 370/328 |

OTHER PUBLICATIONS

Yu, Donsheng, et al.; "Proposal for IEEE 802.16m Downlink Pilot Structure for MIMO"; IEEE C802.16m-08/172r1; Mar. 18, 2008; 44 pages.

Vrzic, Sophie, et al.; "Proposal for IEEE 802.16m Resource Allocation and Control Structure"; IEEE C802.16m-08/176r1; Mar. 18, 2008; 29 pages.

Vrzic, Sophie, et al.; "Proposal for IEEE 802.16m DL MIMO Schemes"; IEEE C802.16m-08/342r1; May 12, 2008; 17 pages.

Office Action dated Jun. 27, 2011; U.S. Appl. No. 12/267,072, filed Nov. 7, 2008; 21 pages.

Final Office Action dated Dec. 27, 2011; U.S. Appl. No. 12/267,072, filed Nov. 7, 2008; 23 pages.

Notice of Allowance dated Sep. 4, 2012; U.S. Appl. No. 12/267,072, filed Nov. 7, 2008; 11 pages.

Notice of Allowance dated May 24, 2013; U.S. Appl. No. 13/620,680, filed Sep. 14, 2012; 11 pages.

* cited by examiner

SYSTEMS AND METHODS FOR NETWORK MIMO

TECHNICAL FIELD OF THE INVENTION

The invention relates to communication systems in general, and particularly to MIMO (Multiple-Input Multiple-Output) communication systems.

BACKGROUND OF THE INVENTION

In a MIMO communication system, a transmitter transmits data through multiple transmitting antennas and a receiver receives data through multiple receiving antennas. The data to be transmitted is usually divided between the transmitting antennas. Each receiving antenna receives data from all the transmitting antennas, so if there are M transmitting antennas and N receiving antennas, then the signal will propagate over M×N channels, each of which has its own channel response. The movement of the receiver in relation to the transmitter results in significant fluctuation in channel conditions. The multiple antennas provide spatial diversity for communications. Typically, if the receiver requires a large transmission power for data, for example a receiver that is geographically located at the edge of a communication cell, the receiver is attended to by using a different transmission than receivers in closer proximity to the transmitter.

In order to improve coverage and throughput, network MIMO can be used. In network MIMO, each receiver is in network MIMO communication with multiple transmitters.

SUMMARY OF THE INVENTION

In accordance with a broad aspect, there is provided a mobile station in a multiple-input, multiple-output (MIMO) system for enabling network MIMO communication between the mobile station and a plurality of base stations. The mobile station comprises a plurality of receive antennas and a control system. The control system is configured to receive in an initial transmission a first set of data transmitted by a master base station and a second set of data transmitted by a slave base station; and receive in a first retransmission the second set of data retransmitted by the master base station.

In some embodiments, the control system is further configured to receive in the first retransmission the first set of data retransmitted by the slave base station.

In some embodiments, the control system receives the retransmitted second set of data from the master base station synchronously with the retransmitted first set of data from the slave base station.

In some embodiments, the control system receives the retransmitted second set of data from the master base station asynchronously with the retransmitted first set of data from the slave base station.

In some embodiments, the first set of data comprises the symbols $s_1$, $s_2$, $-s_1^*$, and $s_1^*$ and the second set of data comprises the symbols $s_3$, $s_4$, $-s_4^*$, and $s_3^*$, where * denotes complex conjugate.

In some embodiments, the symbols $s_1$, $s_2$, $-s_1^*$, and $s_1^*$ are space-time coded, and the symbols $s_3$, $s_4$, $-s_4^*$, and $s^*$ are space-time coded.

In accordance with another broad aspect, there is provided a method in a mobile station in a multiple-input, multiple-output (MIMO) system for enabling network MIMO communication between the mobile station and a plurality of base stations. The method comprises receiving in an initial transmission a first set of data transmitted by a master base station and a second set of data transmitted by a slave base station and receiving in a first retransmission the second set of data retransmitted by the master base station.

In some embodiments, the method further comprises receiving in the first retransmission the first set of data retransmitted by the slave base station.

In some embodiments, receiving the retransmitted second set of data from the master base station occurs synchronously with receiving the retransmitted first set of data from the slave base station.

In some embodiments, receiving the retransmitted second set of data from the master base station occurs asynchronously with receiving the retransmitted first set of data from the slave base station.

In accordance with still another broad aspect, there is provided a multiple-input, multiple-output (MIMO) communication system comprising a master base station having a plurality of transmit antennas and configured to transmit a first set of data to a mobile station in a first transmission and a slave base station having a plurality of transmit antennas and configured to transmit a second set of data to the mobile station in the first transmission. The master base station is further configured to retransmit the second set of data to the mobile station during a first retransmission.

In some embodiments, the slave base station is further configured to retransmit the first set of data to the mobile station during the first retransmission.

In some embodiments, the master base station retransmits the second set of data synchronously with the slave base station retransmitting the first set of data.

In some embodiments, the master base station retransmits the second set of data asynchronously with the slave base station retransmitting the first set of data.

In accordance with yet another broad aspect, there is provided a method in a multiple-input, multiple-output (MIMO) communication system. The method comprises in a master base station, transmitting a first set of data to a mobile station in a first transmission; in a slave base station, transmitting a second set of data to the mobile station in the first transmission; and in the master base station, retransmitting the second set of data to the mobile station during a first retransmission.

In some embodiments, the method further comprises, in the slave base station, retransmitting the first set of data to the mobile station during the first retransmission.

In some embodiments, retransmitting the second set of data to the mobile station during the first retransmission occurs synchronously with retransmitting the first set of data to the mobile station during the first retransmission.

In some embodiments, retransmitting the second set of data to the mobile station during the first retransmission occurs asynchronously with retransmitting the first set of data to the mobile station during the first retransmission.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE INVENTION

In a MIMO system, a base station (BS) provides communication services for a coverage area or cell in a wireless communication system. The term "base station" can refer to any access point providing coverage to an area. The BS transmits communication signals to mobile stations (MSs) via multiple antennas. MSs are also commonly referred to as user terminals, user equipment, and communication devices, for instance. The term "mobile station" can refer to any receiving device (stationary or mobile). At a MS side, multiple receive antennas are employed for each MS.

Figure 1:
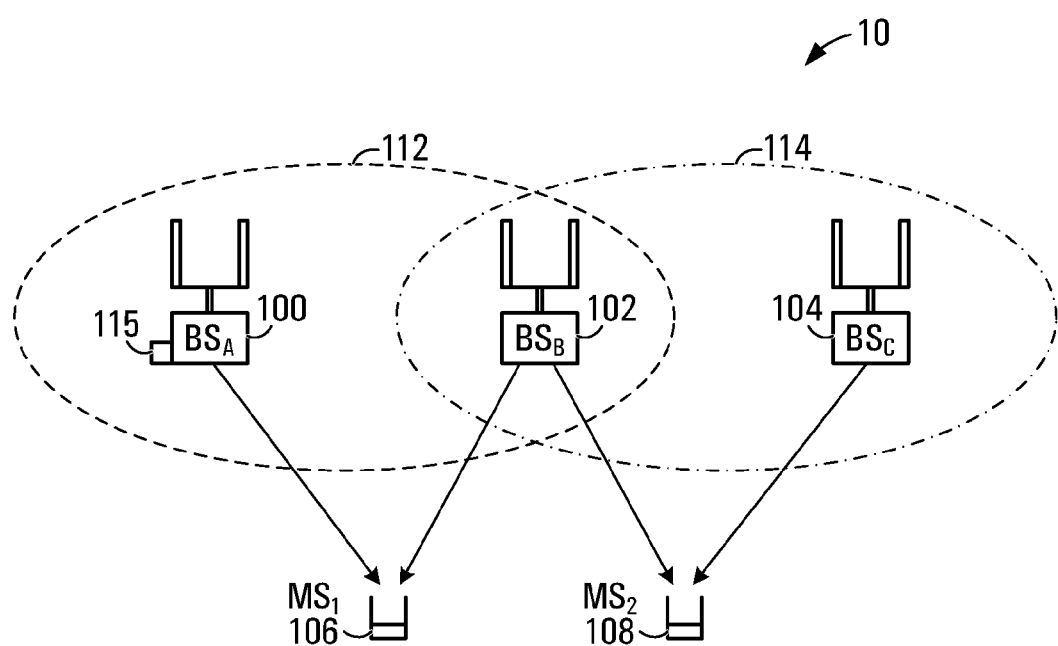
FIG. 1 depicts a MIMO communication system for network MIMO transmissions in accordance with an embodiment.

FIG. 1 shows a MIMO communication system 10 for network MIMO. MIMO communication system 10 includes BSs $BS_A$ 100, $BS_B$ 102, $BS_C$ 104 and MSs $MS_1$ 106, and $MS_2$ 108. Each of $MS_1$ 106 and $MS_2$ 108 can be a wireless device, such as a cellular telephone, a computer with a wireless modem, or a PDA (personal Digital Assistant).

Each of $BS_A$ 100, $BS_B$ 102, $BS_C$ 104 serves a particular cell to facilitate communication with one or more MSs located within the cell associated with the corresponding BS. $MS_1$ 106 is linked to $BS_A$ 100, and $MS_2$ 108 is linked to $BS_C$ 104. Thus, $BS_A$ 100 and $BS_C$ 104 are the serving BSs for $MS_1$ 106 and $MS_2$ 108, respectively. $MS_1$ 106 is located at the intersection of two cells, as is $MS_2$ 108. As such, they are known as "cell-edge" MSs. It is to be understood that cell-edge MSs are a particular example, and embodiments are not limited to cell-edge MSs.

In operation, network MIMO combines antennas from BSs located in neighboring cells to transmit multiple streams to one or more MSs. Thus, each MS is in network MIMO communication with multiple BSs, including its serving BS. More particularly, in network MIMO $MS_a$ 106 can be in network MIMO communication with $BS_A$ 100 and either $BS_B$ 102 or $BS_C$ 104. $MS_2$ 108 can be in network MIMO communication with $BS_C$ 104 and either $BS_A$ 100 or $BS_B$ 102.

In order to support network MIMO, various features are provided by the embodiments described herein: network MIMO co-ordination, feedback, network MIMO with backhaul communications, mobile-assisted network MIMO, network MIMO zone, HARQ re-transmission, and precoded network MIMO. These features are described below.

The following describes network MIMO co-ordination. As noted above, in network MIMO each MS is in network MIMO communication with multiple BSs To determine which BSs are in network MIMO communication with a particular MS, each MS is provided with an "active set." The active set of a MS indicates eligible BSs for network MIMO transmission with that particular MS. The active set may be stored or updated by a MS from time to time. In the example of FIG. 1, $MS_1$ 106 and $MS_2$ 108 each have an active set that indicates that $BS_A$ 100, $BS_B$ 102, and $BS_C$ 104 are eligible for network MIMO transmission.

An active set can be based on any number of considerations, such as the best BSs to be used from a signal strength, proximity, or interference standpoint. For example, the active set of a MS can be based on the signal strength of the preamble of a signal received by the MS. It is to be understood that generation of the active set is not limited to these considerations.

Generally, multiple BSs participating in network MIMO with a MS can be collectively referred to as a "network MIMO group" for a particular MS. The network MIMO group can be a subset of the MS's active set. BSs participating in network MIMO transmission can be referred to as "participating BSs." In FIG. 1, $MS_1$ 106 has a network MIMO group 112 consisting of $BS_A$ 100 and $BS_B$ 102. $MS_2$ 108 has a network MIMO group 114 consisting of $BS_B$ 102 and $BS_C$ 104. Although in FIG. 1 the network MIMO group of $MS_1$ 106 and $MS_2$ 108 is a subset of the MS's active set, this does not have to be the case.

The active set can indicate BSs eligible for network MIMO download and upload. If such download and upload active sets are used, the network MIMO group contains all or a subset of the BSs that are the union of the download and upload active sets. The upload and download groups can be different or the same.

As shown in FIG. 1, $BS_A$ 100 has a control system 115 which is adapted to configure a network MIMO zone. Network MIMO zones are described in more detail below with reference to FIG. 5. Each BS can have a control system.

Figure 2:
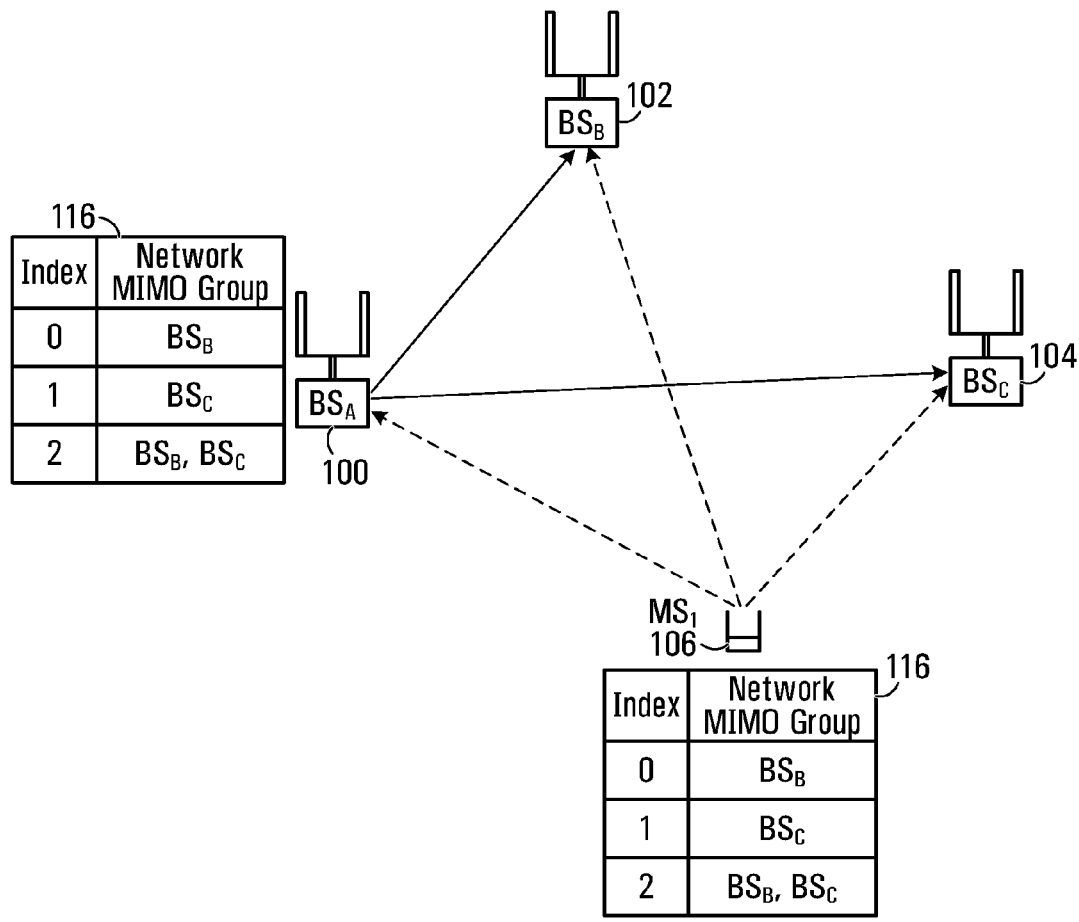
FIG. 2 depicts transmission of a look-up table of possible combinations of network MIMO groups for a mobile station.

An MS determines a network MIMO group based on its active set. An MS may determine the network MIMO group using a look-up table of possible combinations of network MIMO groups, based on the MS's active set. Many combinations are possible. FIG. 2 depicts transmission of a look-up table 116 of possible combinations of network MIMO groups for $MS_1$ 106. The second column of the look-up table 116 defines a combination of network MIMO groups, and the first column defines indices such that each index is associated with a respective combination. Various indexing schemes are possible. According to one indexing scheme, if there is a maximum of N BSs in the network MIMO group, then the look-up table contain combinations of the N−1 BSs, excluding the serving BS. This keeps the number of possible combinations smaller, such that the combinations can be signaled with less overhead. However, the combinations in the table could be extended to include the serving BS. If the serving BS is excluded from the combinations, the number of rows in the look-up table would be $2^{(N-1)}-1$. Such an indexing scheme has been used for the look-up table 116. Referring to FIG. 2, $MS_1$ 106 can have a maximum of 3 BSs in any of its network MIMO groups, so the look-up table 116 contains combinations of 3−1=2 BSs, excluding serving $BS_A$ 100. Look-up table 116 has $2^{(3-1)}-1=3$ rows. Referring to the first row, a network MIMO group consisting of $BS_B$ 102 is associated with index "0". Referring to the second row, a network MIMO group consisting of $BS_C$ 104 is associated with index "1". Referring to the third row, a network MIMO group consisting of $BS_B$ 102 and $BS_C$ 104 is associated with index "2".

$MS_1$ 106 generates the look-up table 116 based on its active set. The look-up table 116 is stored at $MS_1$ 106 and its serving $BS_A$ 100. Alternatively, the look-up table 116 is generated independently at serving $BS_A$ 100 by following certain rules.

For example, if $MS_1$ 106 sends a network MIMO group in a certain order, the look-up table can be generated according to such order. Although in this example the rule for generating the table depends on the order in which $MS_1$ 106 reports the network MIMO group, other rules may be used.

After generating the look-up table 116, $MS_1$ 106 determines a network MIMO group and can transmit an index associated with the network MIMO group. The index can be transmitted on an uplink (UL) feedback channel. Transmitting the index can require N−1 bits, which may not be large in practical network MIMO communication systems.

In the example of FIG. 2, if $MS_1$ 106 decides to receive network MIMO transmissions from $BS_A$ 100 and $BS_B$ 102, then $MS_1$ 106 looks up the combination $BS_B$ 102 in the look-up table 116, notes that this combination is associated with index "1", and transmit index "1". $MS_1$ 106 transmits the index to its serving $BS_A$ 100, which relays the index to the remaining BSs in the network MIMO group, namely $BS_B$ 102 and $BS_C$ 104 (illustrated using solid lines). Alternatively, $MS_1$ 106 broadcasts the index to the network MIMO group, namely $BS_A$ 100 and $BS_B$ 102 (illustrated using broken lines). The index may be transmitted on a UL feedback channel. In addition to an index, MS identification data, such as a MS identifier (ID), can also be transmitted to a BS in order to allow that BS to decode information from and relay information to the MS. Whenever the network MIMO group of a MS changes, for example due to a change in the active set of that MS, its serving BS sends the updated look-up table to the remaining BSs in the updated active set.

Upon receipt of the index from $MS_1$ 106, a BS retrieves the corresponding network MIMO group, and prepares for network MIMO accordingly. For example, $BS_B$ 102 will note that it is listed in the network MIMO group and prepares for network MIMO with $MS_1$ 106, while $BS_C$ 104 notes that it is not listed in the network MIMO group and therefore does not prepare for network MIMO with $MS_1$ 106.

The above described network MIMO co-ordination, including determining a network MIMO group based on an active set. Before such determination, a MS can be involved in feedback to assist in making that determination. The following describes such feedback.

MSs that are eligible for network MIMO are sent an indication of eligibility for network MIMO. Such indication can be sent to MSs within a cell, cell-edge MSs, or both.

Upon receiving an indication of network MIMO, a MS measures C/I (Carrier to Interference Ratio) based on pilots the MS has received.

The MS determines whether it is ready to receive network MIMO transmission. The determination can be based on various factors. Three example factors are described below.

The determination can be based on an absolute C/I threshold and/or a difference in the C/Is of a MS's neighboring BSs, since the MS has full knowledge of the channel conditions of the BSs in the active set.

The determination can be based on instantaneous or average channel conditions. In this case, a subset of the BSs could be in the active set.

The determination can be based on the MS's receiver structure, for example Minimum Mean-Squared Error (MMSE) or Successive Interference Cancellation (SIC) with MMSE. With SIC, the MS can decide to do network MIMO when three is a larger differential in the C/I between serving BS and the remaining BSs in its active set than in the case where SIC is not used.

If the MS determines that it is not ready, the MS does not send a network MIMO indication. IF the MS determines that it is ready, the MS sends feedback information, including a network IMO indication, information on the C/Is, an index, and an indication of MIMO mode. MIMO mode refers to the type of MIMO transmission, such as open-loop, closed-loop, blast, SM (spatial multiplexing), and STTD (space-time transmit diversity). The MS can also send a preferred matrix index to indicate its choice of precoding.

The MS sends the feedback to all BSs in the network MIMO group, or a subset of it.

The serving BS designates UL resources for the feedback information. The serving BS signals the location of the UL resources to the network MIMO group so that the network MIMO group can retrieve the feedback information. Since only a subset of the BSs in the network MIMO group may be involved in an actual network MIMO transmission, the BS sends the index on the uplink.

Since the uplink and downlink active sets may be different, the UL feedback can be sent in two ways. If the participating BSs are in the uplink active set, the UL feedback channel can be adjusted so that it targets the participating BSs to hear the feedback. For example, if the participating BSs are in the uplink active set (e.g. in TDD (Time Division Duplex)), the UL feedback channel can be adjusted in terms of power. If the participating BSs are not in the uplink active set, the serving BS is responsible for decoding the UL feedback.

The BS can encode transmissions vertically or horizontally, as described below.

For vertical encoding or STTD, on C/I is reported. The C/I channel is scrambled by the MS ID. Since one encoded packet can be sent to multiple streams in vertical encoding, the participating BSs can encode the same data independently (since they have already been receiving copies of the MS data) and extract the portion of the encoded data for transmission. Alternatively, the serving BS encodes the data and sends the portion of the encoded data to the BSs in the network MIMO.

For horizontal encoding, C/Is for different streams are reported for each participating BS. A C/I channel can be scrambled by the MS ID. The BSs that will participate in the network MIMO transmission to the MS may be signaled by the index of the look-up table. The order of the C/I report for each stream (whether it is encoded separately or jointly) corresponds to the order in the entry of the look-up table.

The serving BS performs Modulation and Coding Scheme (MCS) selections based on the reported C/Is and signals the other participating BSs and MCS. Alternatively, MCS selection can be performed independently by the participating BSs.

Figure 3:
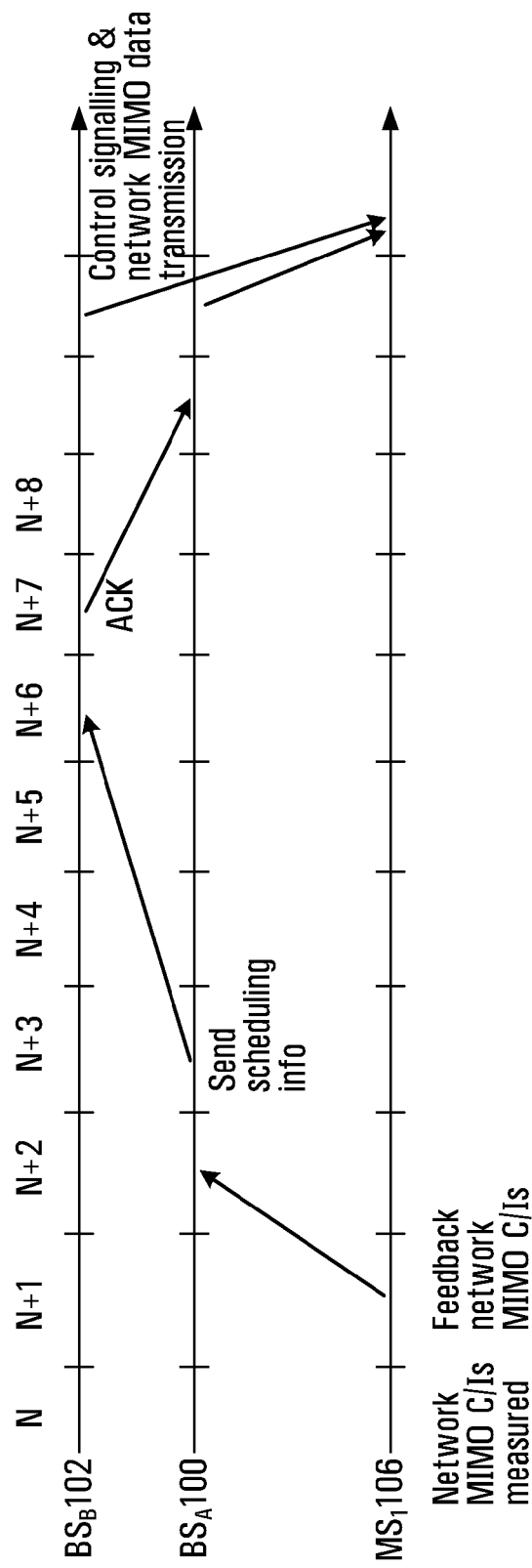
FIG. 3 depicts a representative example of one possible frame diagram of network MIMO with backhaul communication.

FIG. 3 depicts a representative example of one possible frame diagram of network MIMO with backhaul communication. $MS_1$ 106, $BS_A$ 100 and $BS_B$ 102 can communicate with each other over frames N to N+8. As noted above, $MS_1$ 106 measures C/Is for the network MIMO. $MS_1$ 106 feedbacks the C/Is to the serving $BS_A$ 100. Serving $BS_A$ 100 can send to the other participating Bs, namely $BS_B$ 102, scheduling information, which includes information on resource allocation, the MCS, the MIMO mode, and the transmission time (e.g. frame number with the appropriate offset for the different BSs). Alternatively, the scheduling can be performed by each participating BS individually.

Serving $BS_A$ 100 can also send an indication of eligibility for network MIMO.

$BS_B$ 102 can send an indication of participation in the network MIMO, for instance an acknowledgement (e.g. an ACK) to indicate participation, or a negative acknowledgement (e.g. a NACK) to indicate no participation for example due to loading in the BSs.

If serving $BS_A$ 100 does not receive a response from $BS_B$ 102, then $BS_A$ 100 can assume that the indication of eligibility was not received by $BS_B$ 102. In that case, $BS_A$ 100 can resend the indication of eligibility.

Where there are only two BSs in the network MIMO group, such as $BS_A$ 100 and $BS_B$ 102, serving $BS_A$ 100 can change the MIMO mode if $BS_B$ 102 does not respond or a NACK is received. For example, an STTD rate 2 can be changed to STTD rate 1.

Finally, $BS_A$ 100 or $BS_B$ 102 transmits control signaling data and network MIMO data to $MS_1$ 106.

Figure 4:
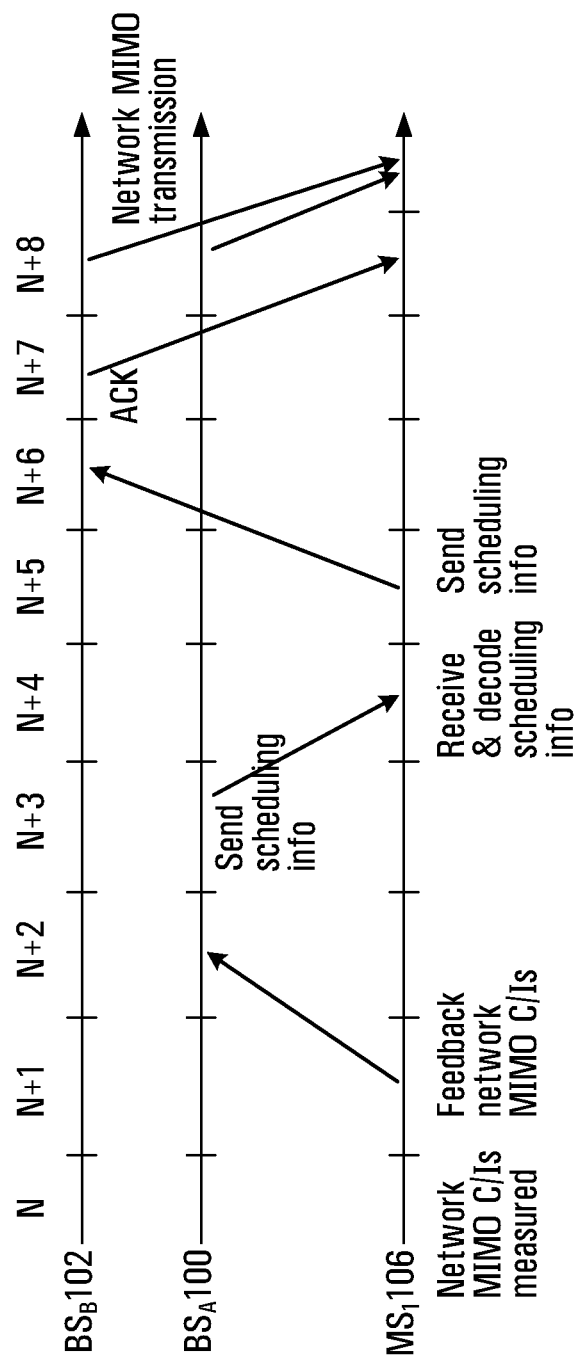
FIG. 4 depicts a representative example of one possible frame diagram of mobile-assisted network MIMO communication.

FIG. 4 depicts a representative example of one possible frame diagram of mobile-assisted network MIMO communication, as an alternative to the network MIMO with backhaul communications of FIG. 3. Mobile-assisted network MIMO uses signaling between BSs and MSs to enable network MIMO transmissions.

Mobile-assisted network MIMO eliminates backhaul signaling among BSs. It deals with network MIMO when at least one participating BS is from another cell.

The MS is used relay information. Together with short frame duration, mobile-assisted Network MIMO reduces the scheduling delay and enables more dynamic scheduling.

In every superframe, a set of resources for network MIMO transmission, known as a network MIMO zone, is configured. Network MIMO zones are described in more detail below with reference to FIG. 5. Participating BSs are determined based on MS feedback.

Referring to FIG. 4, the steps of $MS_1$ 106 measuring C/Is for the network MIMO and feeding back the C/Is to the master $BS_A$ 100 are the same as in FIG. 3.

Afterwards, the serving $BS_A$ 100 schedules $MS_1$ 106 in the network MIMO zone using a scheduler. A fixed amount of time is allowed to elapse between this decision of the scheduler and actual transmission, for instance 5 frames from N+4 to N+8 in the example of FIG. 4.

$BS_A$ 100 sends scheduling information to $MS_1$ 106, including resource allocation, MCS, and MIMO mode. At frame N+5, $MS_1$ 106 relays the scheduling info to the participating BSs, such as $BS_B$ 102.

$BS_B$ 102 sends an indication of participation in the network MIMO, such as an ACK, to $MS_1$ 106, so that $MS_1$ 106 can be ready to decode data from $BS_B$ 102. This allows $MS_1$ 106 to determine how many participating BSs successfully receive the indication of eligibility for network MIMO. If $MS_1$ 106 does not receive an ACK/NACK from $BS_B$ 102, it assumes that the indication of eligibility for network MIMO was not received by $BS_B$ 102. The $MS_1$ 106 sends the scheduling info through higher-layer signaling to re-synchronize the data.

Finally $BS_A$ 100 and $BS_B$ 102 transmit data to $MS_1$ 106.

Figure 5:
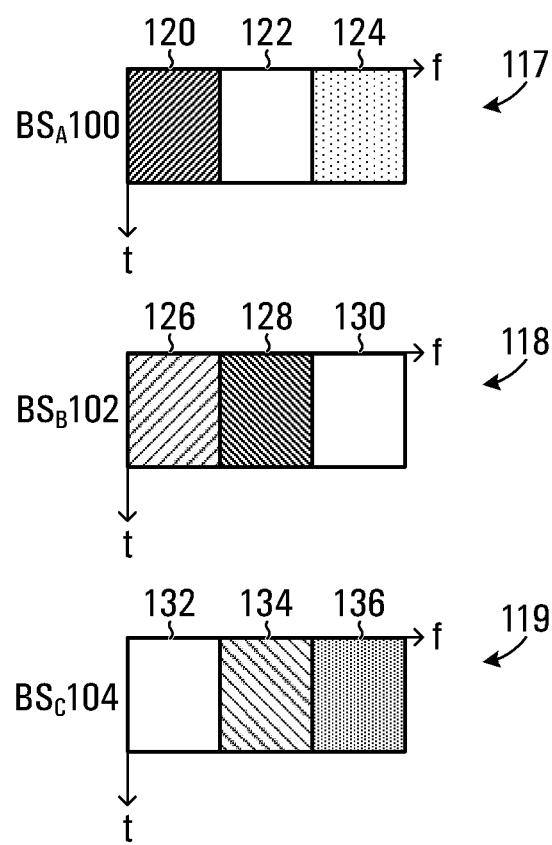
FIG. 5 is an example schematic diagram of three network MIMO zones for each BS.

FIG. 5 is an example schematic diagram of three network MIMO zones for each BS. Generally, resources for network MIMO transmission are referred to as a "network MIMO zone". The network MIMO zone can be described as a set of two dimensional resources (time and frequency), though in some embodiments code spreading can be used to provide a third dimension. The network MIMO zone can be a TDM (Time Divisional Multiplexing)-based zone, an FDM (Frequency Division Multiplexing)-based zone, or a combined TDM/FDM-based zone.

Referring to FIG. 5, shown are resources 117,118,119 for $BS_B$ 102, and $BS_C$ 104, respectively. These resources are shown as having a two dimensional appearance in which the horizontal direction is frequency and the vertical direction is time. The resources for each BS are partitioned into 3 zones, which can be used for network MIMO transmission. In the example of FIG. 5, a MS is in network MIMO communication with $BS_A$ 100, $BS_B$ 102, and $BS_C$ 104 of FIG. 1.

Shown are various types of partitions. For each resource, a BS known as the "master" BS transmits, and other participating BSs transmit as "slaves". For illustration purposes, a network MIMO zone assigned to a master for network MIMO transmission is illustrated with dense stripes or dotting. A network MIMO zone assigned to a slave for network MIMO transmission is illustrated with light stripes or dotting. A network MIMO zone assigned to a BS for non-network-MIMO transmission is illustrated with blank space. If there is no data transmission in a network MIMO zone, non-network MIMO transmission can be scheduled to avoid wastage of resources.

More specifically, resource 117 has a network MIMO zone 120 assigned to $BS_A$ 100 as master for network MIMO transmission, a network MIMO zone 122 assigned to $BS_B$ 102 for non network MIMO transmission, and a network MIMO zone 124 assigned to $BS_C$ 104 as slave for network MIMO transmission. On network MIMO zone 120, $BS_A$ 100 can transmit data to a network MIMO MS (not shown). $BS_A$ 100 can transmit, on network zone 122, data to a non-network MIMO MS, i.e. a MS not in network MIMO with BSs $BS_A$ 100, $BS_B$ 102, and $BS_C$ 104. $BS_A$ 100 can transmit, on network MIMO zone 124, data that $BS_C$ 104 has instructed it to transmit, to the network MIMO MS.

Resource 118 has a network MIMO zone 126 assigned to $BS_A$ 100 as slave for network MIMO transmission, a network MIMO zone 128 assigned to $BS_B$ 102 as master for network MIMO transmission, and a network MIMO zone 130 assigned to $BS_C$ 104 for non network MIMO transmission. Resource 119 has a network MIMO zone 132 assigned to $BS_A$ 100 for non network MIMO transmission, a network MIMO zone 134 assigned to $BS_B$ 102 as slave for network MIMO transmission, and a network MIMO zone 136 assigned to $BS_C$ 104 as master for network MIMO transmission.

The same channelization procedure and hopping pattern arrangement can be used. Thus, the allocation of sub-resources to users in the same for all of the network MIMO zones for a network MIMO group. However, when no network MIMO is scheduled, BS specific channelization procedure and hopping pattern can be used.

The size of the network MIMO zone can be configured every superframe based on the number of network MIMO users.

Figure 6:
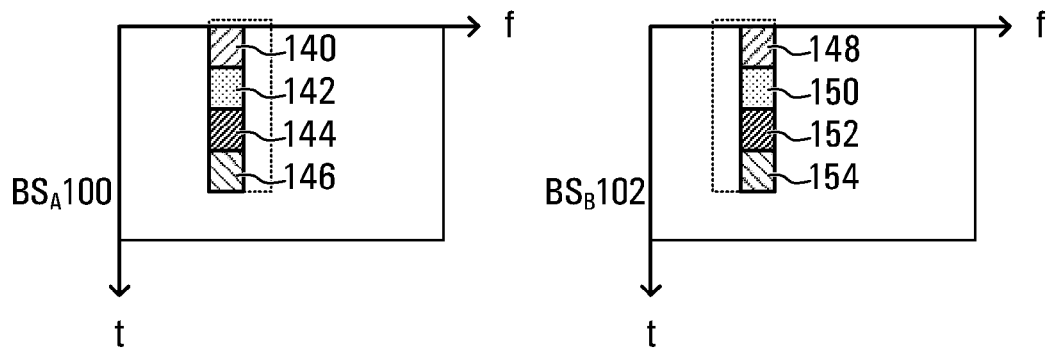
FIGS. 6 and 7 depict exemplary scattering of pilot symbols.
Figure 7:
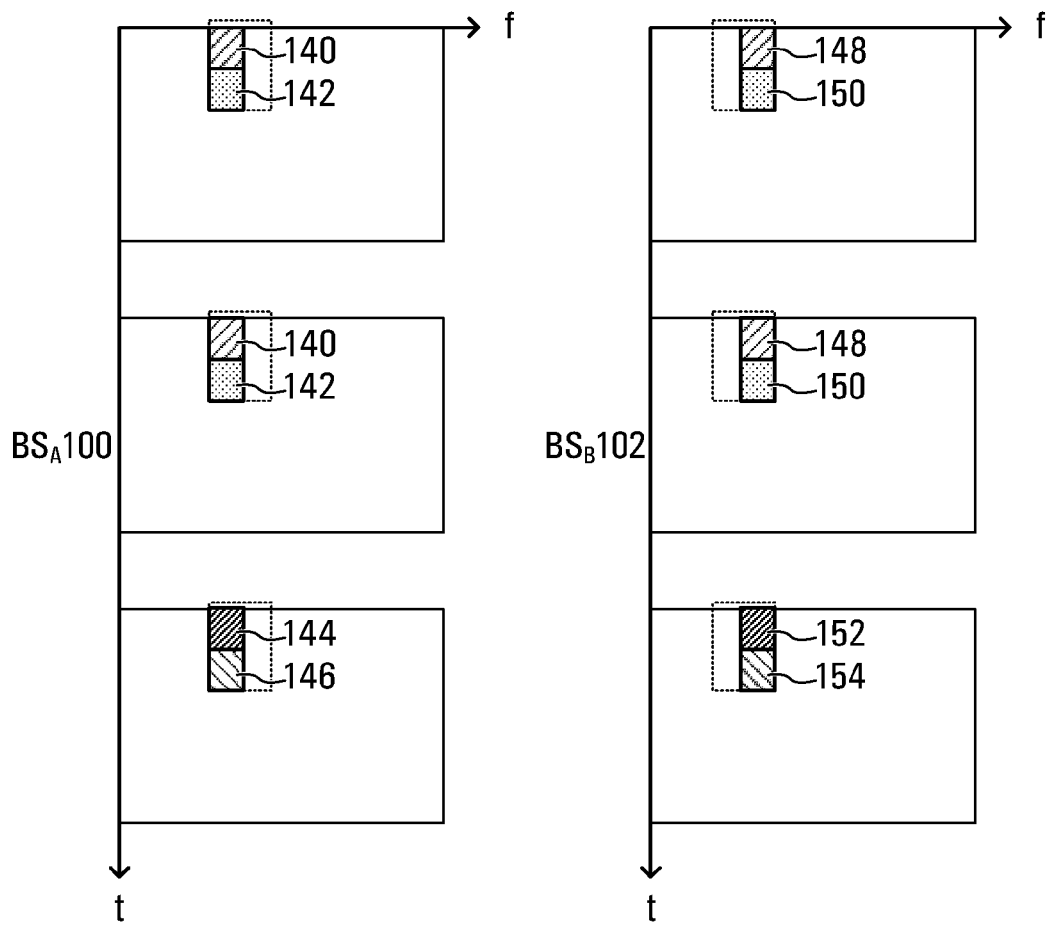

FIGS. 6 and 7 depict exemplary scattering of pilot signals. BSs send pilot signals, which the MSs receive an use for channel estimation. Common pilots that are orthogonal can be used. This can facilitate channel estimation and precoder selection for closed loop network MIMO.

The pilots can be sent for all antennas, or for a subset of antennas with cycling. Such pilot subset cycling can reduce pilot overhead. Alternatively, other pilots could be used, for example dedicated pilots.

FIG. 6 depicts an embodiment where 2 BSs send pilots for all antennas. Shown on the left side is a network MIMO zone in which pilots for all of the two antennas of $BS_A$ 100 of FIG. 1 have been scheduled, namely pilots 140,142,144,146. Shown on the right side is a network MIMO zone in which pilots for all of the two antennas of $BS_B$ 102 of FIG. 1 have been scheduled, namely pilots 148,150,152,154.

In operation, participating BSs send pilots to a MS. The MS receives the pilots, measures the C/Is for the pilots, estimate channels for all antennas, and report on the C/Is.

The MS can be configured to receive data transmission from the antennas of the BSs and report on their C/Is in any number of ways. More specifically, the MS can be configured to receive data transmission from all antennas, data transmission with antenna hopping, or data transmission with antenna selection.

In the case of data transmission from all antennas, the MS reports one or multiple C/Is for all antennas, and BSs transmit data from all antennas. Transmission at an STTD (Space-time block coding based transmit diversity) rate 2 can be used.

In the case of data transmission with antenna hopping, the MS reports one or multiple C/Is for all antennas, and BSs transmit data on a subset of the antennas with a pre-defined hopping pattern which hops around all antennas. Transmission at an STTD rate 1 with antenna hopping can be used.

In the case of data transmission with antenna selection, the MS reports one or multiple C/Is for a subset of antennas. The BSs transmit data on the subset of antennas.

Since pilots are sent for all transmit antennas and the MS needs to estimate channels for all antennas, the embodiment of FIG. 6 can represent a higher overhead and computation complexity. However, it can provide full flexibility to achieve spatial diversity.

FIG. 7 depicts an embodiment where to BSs send a subset of pilots and cycle the pilots in a regular interval. Only a subset of pilots is sent on a network MIMO zone to reduce the pilot overhead. More specifically, $BS_A$ 100 of FIG. 1 sends a subset consisting of pilots 140,142, and later a subset consisting of pilots 144,146. $BS_B$ 102 of FIG. 1 sends a subset consisting of pilots 140,142, and later a subset consisting of pilots 144,146.

Pilots are cycled in a pre-defined pattern in a regular interval for additional spatial diversity. In order to enable proper C/I reporting and channel estimation for data demodulation, the pilot cycling pattern can be configured to be changed only every superframe so that within the superframe, a MS reports and estimates channels from the same set of pilots.

The MS measures the C/Is from all pilots.

As with the embodiment of FIG. 6, in FIG. 7 the MS can be configured for receiving data transmission from all antennas, data transmission with antenna hopping, or data transmission with antenna selection.

Figure 8:
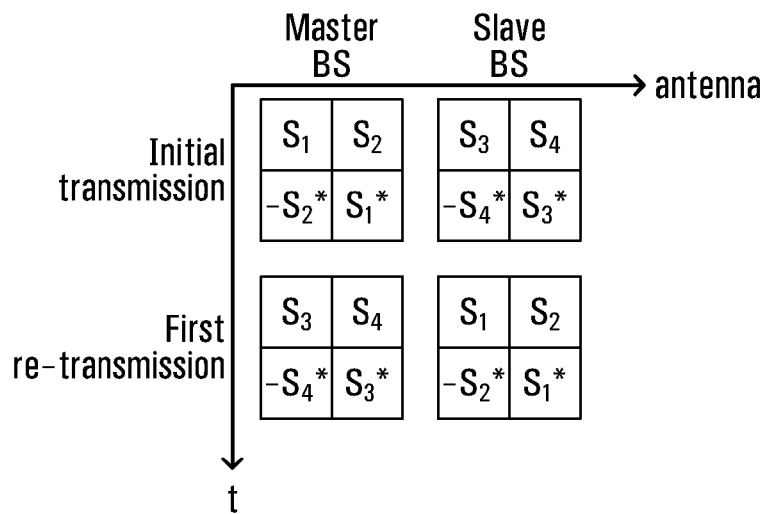
FIG. 8 depicts a diagram of a HARQ (Hybrid Automatic Repeat Request) re-transmission scheme.

FIG. 8 depicts a diagram of a HARQ re-transmission scheme. Re-transmission can be either synchronous or asynchronous.

A network MIMO resource assignment can be persistent until either the packet is correctly received or N packets are correctly received. A MS may have enough data for consecutive transmissions without additional signaling.

The data can be cycled through the BSs in re-transmission for additional diversity such that the MS receives all the data in subsequent re-transmissions even if only the serving BS is transmitting, for example in STTD rate 2.4. Instead of STTD, Space-Time Coding (STC) could be used.

In the example of FIG. 8, in an initial transmission, a first set of data (shown as symbols $s_1$, $s_2$, $-s_1^*$, and $s_1^*$) is sent by a master BS and a second set of data (shown as symbols $s_3$, $s_4$, $-s_4^*$, and $s_3^*$) is sent by a slave BS. In the first re-transmission, the second set of data is sent by the master BS and the first set of data is sent by the slave BS.

As noted above in respect of FIG. 2, the BS can encode transmissions vertically or horizontally.

In vertical encoding, one ACK/NACK is used for each transmission. The MS decodes the data successfully and sends an ACK to the BSs. All BSs receive the ACK. BSs can schedule other users in the resource. Where at least one BS does not receive the ACK or mistake it as a NACK, these BSs retransmit the data and do not hear the ACK/NACK again. In other words, they abort re-transmission.

Where the MS is unable to decode the data, the MS sends a NACK as an ACK, the BS schedules non-network MIMO users in a network MIMO zone. The MS may still soft-combine all data, but half of the data will be corrupted. To resolve this issue, a re-transmission indicator (e.g. 1 bit) can be sent from each BS to indicate the presence of re-transmission from that particular BS. For example, the MS only soft-combines data from BSs with the indicator set to 1. Alternatively, the MS blindly detects the received signal (after soft-combining) by assuming that the received signal either contains the re-transmission or not.

In horizontal encoding, on ACK/NACK is used for each layer. The sections of data are cycled for redundancy. When one layer finishes re-transmission, it can retransmit the data in another layer so that it can be soft combined for diversity (e.g. SFN transmission). For example, in a 2-layer spatial multiplexing, when the first layer is received successfully while the other layer is not, the same data for the $2^{nd}$ layer can be transmitted on the first layer in subsequent re-transmissions.

The following describes precoding in network MIMO. In a network MIMO zone, orthogonal common pilots facilitate channel estimation of the network MIMO channel and joint precoder selection. The joint precoder can be selected in many ways, for example by the serving BS, the other participating BSs, or the MS. The serving BS can select the joint precoder based on sounding. The MS can select the joint precoder based on feedback.

In codebook-based precoding, the network MIMO MS determines a preferred precoder.

Participating BSs obtain precoder feedback via a UL feedback channel, and may need to confirm the choice of precoder via backhaul handshake.

If the precoder is a matrix of size $N_{tx\_total} \times N_{streams}$, and each BS has $N_{tx}$ transmit antennas, then the precoder is divided into blocks of an $N_{tx} \times N_{streams}$ submatrix with the master BS using the first block, and the second BS using the second block. The order is already determined by the look-up table 180, and the index is signaled by the MS as described in respect of FIG. 2.

To further illustrate network MIMO, a very specific example of a network MIMO communication system is set forth below.

In a network MIMO zone, the pilot pattern used can be a four antenna pattern in accordance with C802.16m-08/172rl. Each BS transmits pilots for 2 different antennas.

The HARZ re-transmission is asynchronous, synchronous, or RAS-HARQ.

A permutation index can be used to signal the resource partition within the network MIMO zone in accordance with C802.16m-08/172rl.

A diversity zone or a localized zone is used, as described below.

In a diversity zone, a network MIMO zone is defined by using the same channelization procedure as for Fractional Frequency Reuse (FFR). A FFR zone corresponding to reuse one is used for network MIMO. A common hopping pattern is used by the coordinating BSs in this zone. If there is no MS eligible for network MIMO transmission, BS specific hopping pattern is used and non-network MIMO MSs are scheduled.

In a localized zone, localized zones between coordinating BSs are physically aligned. Network MIMO is transparent to the user in the case of asynchronous HARQ. In synchronous HARQ or RAS-HARQ, only the timing of the re-transmissions is different in network MIMO to account for the delay associated with coordinating the transmissions. The C/I measurement pilots are located on the same tones as in the case of a network MIMO zone for non-network MIMO transmission. The control information is the same as in the network MIMO zone for non-network MIMO transmission.

In terms of procedure, a BS configures a network MIMO zone with a neighboring BS. The location of the network MIMO zone, the coordinating BS ID, and the hopping pattern are signaled in a superframe header. The BS schedules a user in the network MIMO zone. The BS coordinates various aspects with the participating BSs supporting the serving BS, including user election and resource assignment. The BS sends control information and transmission data to the MS. Re-transmission can occur either inside or outside the network MIMO zone.

A MS reports its active set to its serving BS, which can be based on signal strength, or a static determination. This indicates which BSs can be used for network MIMO transmission. For an open loop, the MS measures and reports the C/I for STTD or SM (spatial multiplexing) to the serving BS. For a closed loop, the MS measures and reports a precoding matrix index (PMI), a rank and C/I to the serving BS. The rank generally refers to the number of streams that the MS is able to receive. The MS decodes the control and transmitted data, and sends an ACK/NACK to the serving BS.

Figure 9:
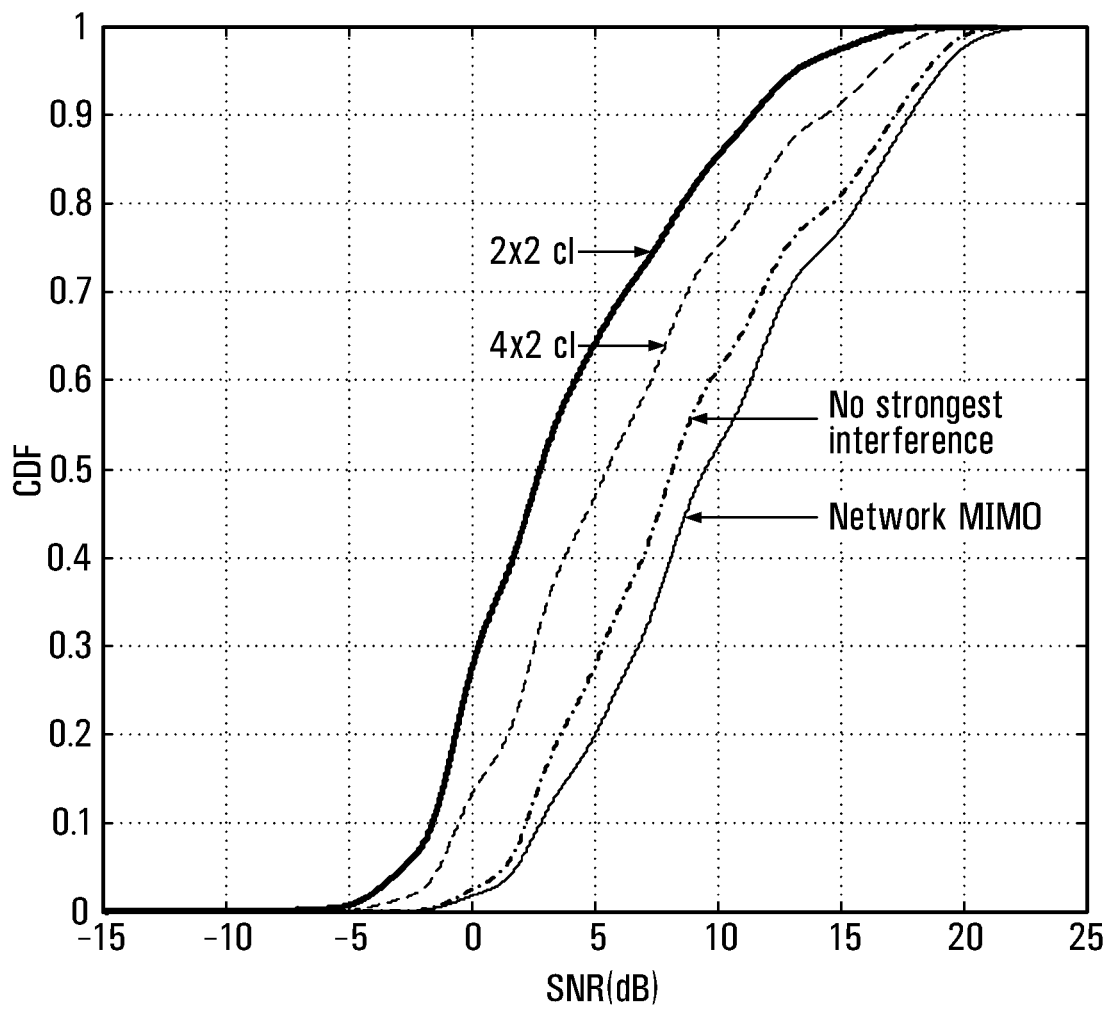
FIG. 9 is a plot relating to network MIMO precoding.

FIG. 9 is a plot relating to network MIMO precoding. The plot shows cumulative distribution functions (CDF) against Signal to Noise Ratios (SNR) for various scenarios). FIG. 9 shows the possible gain or network MIMO over 2×2 CL (closed loop) MIMO and 4×2 CL MIMO. It also shows the gain over the case where the most dominant interferer is not transmitting.

Figure 10:
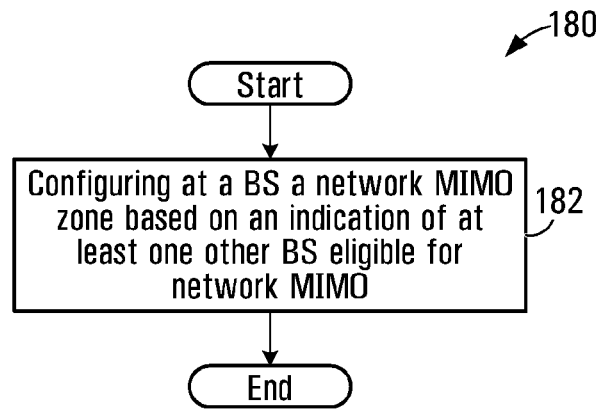
FIG. 10 is a flowchart of a method, in a system, of enabling network MIMO among a plurality of base stations and at a least one mobile station.

FIG. 10 is a flowchart of a method 180, in a system, of enabling network MIMO among a plurality of BSs and at a least one MS. Step 182 involves configuring at a BS a network MIMO zone based on an indication of at least one other BS eligible for network MIMO. The network MIMO zone is defined by resources having at least time and frequency dimensions allocated for master transmission under control of the BS, or slave transmission under control of one of the at least one other BS eligible for network MIMO.

Figure 11:
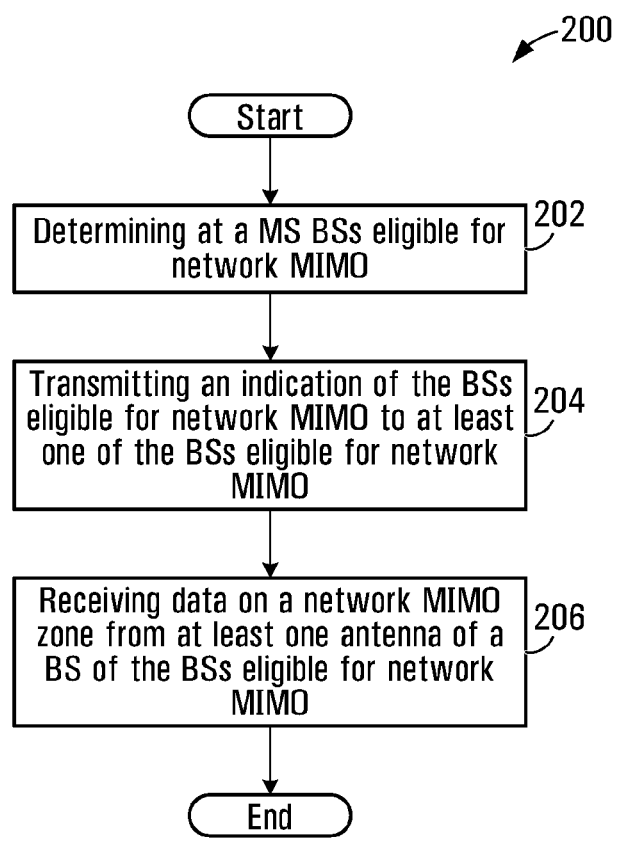
FIG. 11 is a flowchart of a method, in a mobile station, of enabling network MIMO among a plurality of base stations and at a least one mobile station.

FIG. 11 is a flowchart of a method 200, in a MS, of enabling network MIMO among a plurality of BSs and at a least one MS. Step 202 involves determining at the MS BSs eligible for network MIMO. Step 204 involves transmitting an indication of the BSs eligible for network MIMO to at least one of the BSs eligible for network MIMO. Step 206 involves receiving data on a network MIMO zone from at least one antenna of a BS of the BSs eligible for network MIMO. The network MIMO zone is defined by a resource allocated for master transmission under control of the BS, or slave transmission under control of another BS eligible for network MIMO.

What has been described is merely illustrative of the application of the principles of the invention. Other arrangements and methods can be implemented by those skilled in the art without departing from the spirit and scope of the present invention.

What is claimed is:

1. A mobile station in a multiple-input, multiple-output (MIMO) system for enabling network MIMO communication between the mobile station and a plurality of base stations, the mobile station comprising:
   a plurality of receive antennas; and
   a control system configured to:
      receive in an initial transmission a first set of data transmitted by a master base station and a second set of data transmitted by a slave base station, wherein the first set of data comprises the symbols $s_1, s_2, -s_2, $ and $s_1*$ and the second set of data comprises the symbols $s_3, s_4, -s_4*$ and $s_3*$ where * denotes complex conjugate wherein the symbols $s_1, s_2, -s_2*,$ and $s_1*$ are space-time coded and the symbols $s_3, s_4, -s_4*,$ and $s_3*$ are space-time coded; and
      receive in a first retransmission the second set of data retransmitted by the master base station.

2. The mobile station as set forth in claim 1, wherein the control system is further configured to receive in the first retransmission the first set of data retransmitted by the slave base station.

3. The mobile station as set forth in claim 2, wherein the control system receives the retransmitted second set of data from the master base station synchronously with the retransmitted first set of data from the slave base station.

4. The mobile station as set forth in claim 2, wherein the control system receives the retransmitted second set of data from the master base station asynchronously with the retransmitted first set of data from the slave base station.

5. A method in a mobile station in a multiple-input, multiple-output (MIMO) system for enabling network MIMO communication between the mobile station and a plurality of base stations, the method comprising:
   receiving in an initial transmission a first set of data transmitted by a master base station and a second set of data transmitted by a slave base station, wherein the first set of data comprises the symbols s1, s2, −s2*, and s1* and the second set of data comprises the symbols s3, s4, −s4*, and s3*, where * denotes complex conjugate, wherein the symbols s1, s2, −s2*, and s1* are space-time coded and the symbols s3, s4, −s4*, and s3* are space-time coded; and
   receiving in a first retransmission the second set of data retransmitted by the master base station.

6. The method as set forth in claim 5, further comprising receiving in the first retransmission the first set of data retransmitted by the slave base station.

7. The method as set forth in claim 6, wherein receiving the retransmitted second set of data from the master base station occurs synchronously with receiving the retransmitted first set of data from the slave base station.

8. The method as set forth in claim 6, wherein receiving the retransmitted second set of data from the master base station occurs asynchronously with receiving the retransmitted first set of data from the slave base station.

9. A multiple-input, multiple-output (MIMO) communication system comprising:
   a master base station having a plurality of transmit antennas and configured to transmit a first set of data to a mobile station in a first transmission, wherein the first set of data comprises the symbols s1, s2, −s2*, and s1* and the second set of data comprises the symbols s3, s4, −s4*, and s3*, where * denotes complex conjugate, wherein the symbols s1, s2, −s2*, and s1* are space-time coded and the symbols s3, s4, −s4*, and s3* are space-time coded; and
   a slave base station having a plurality of transmit antennas and configured to transmit a second set of data to the mobile station in the first transmission,
   wherein the master base station is further configured to retransmit the second set of data to the mobile station during a first retransmission.

10. The MIMO communication system as set forth in claim 9, wherein the slave base station is further configured to retransmit the first set of data to the mobile station during the first retransmission.

11. The MIMO communication system as set forth in claim 10, wherein the master base station retransmits the second set of data synchronously with the slave base station retransmitting the first set of data.

12. The MIMO communication system as set forth in claim 10, wherein the master base station retransmits the second set of data asynchronously with the slave base station retransmitting the first set of data.

13. A method in a multiple-input, multiple-output (MIMO) communication system, the method comprising:
   in a master base station having a plurality of transmit antennas, transmitting a first set of data to a mobile station in a first transmission, wherein the first set of data comprises the symbols s1, s2, −s2*, and s1* and the second set of data comprises the symbols s3, s4, −s4*, and s3*, where * denotes complex conjugate, wherein the symbols s1, s2, −s2*, and s1* are space-time coded and the symbols s3, s4, −s4*, and s3* are space-time coded;
   in a slave base station having a plurality of transmit antennas, transmitting a second set of data to the mobile station in the first transmission; and
   in the master base station, retransmitting the second set of data to the mobile station during a first retransmission.

14. The method as set forth in claim 13, further comprising, in the slave base station, retransmitting the first set of data to the mobile station during the first retransmission.

15. The method as set forth in claim 14, wherein retransmitting the second set of data to the mobile station during the first retransmission occurs synchronously with retransmitting the first set of data to the mobile station during the first retransmission.

16. The method as set forth in claim 14, wherein retransmitting the second set of data to the mobile station during the first retransmission occurs asynchronously with retransmitting the first set of data to the mobile station during the first retransmission.

* * * * *

UNITED STATES PATENT AND TRADEMARK OFFICE
CERTIFICATE OF CORRECTION

PATENT NO. : 9,237,458 B2
APPLICATION NO. : 13/932754
DATED : January 12, 2016
INVENTOR(S) : Kelvin Kar-Kin Au et al.

It is certified that error appears in the above-identified patent and that said Letters Patent is hereby corrected as shown below:

Claims

Claim 1, Column 11, Line 66 replace "-$s_2$," with -- -$s_2$*,--

Claim 5, Column 12, Lines 27-32 should read --of data comprises the symbols $s_1$, $s_2$, -$s_2$*, and $s_1$* and the second set of data comprises the symbols $s_3$, $s_4$, -$s_4$*, and $s_3$*, where * denotes complex conjugate, wherein the symbols $s_1$, $s_2$, -$s_2$*, and $s_1$* are space-time coded and the symbols $s_3$, $s_4$, -$s_4$*, and $s_3$* are space-time coded; and--

Claim 9, Column 12, Lines 52-57 should read --of data comprises the symbols $s_1$, $s_2$, -$s_2$*, and $s_1$* and the second set of data comprises the symbols $s_3$, $s_4$, -$s_4$*, and $s_3$*, where * denotes complex conjugate, wherein the symbols $s_1$, $s_2$, -$s_2$*, and $s_1$* are space-time coded and the symbols $s_3$, $s_4$, -$s_4$*, and $s_3$* are space-time coded; and--

Claim 13, Column 13, Lines 14-18 should read --comprises the symbols $s_1$, $s_2$, -$s_2$*, and $s_1$* and the second set of data comprises the symbols $s_3$, $s_4$, -$s_4$*, and $s_3$*, where * denotes complex conjugate, wherein the symbols $s_1$, $s_2$, -$s_2$*, and $s_1$* are space-time coded and the symbols $s_3$, $s_4$, -$s_4$*, and $s_3$* are space-time--

Signed and Sealed this
Twelfth Day of April, 2016

Michelle K. Lee
*Director of the United States Patent and Trademark Office*